Aug. 12, 1924.
M. ZIEHLKE ET AL
1,504,853
DIRECTION SIGNAL
Filed Feb. 25, 1924
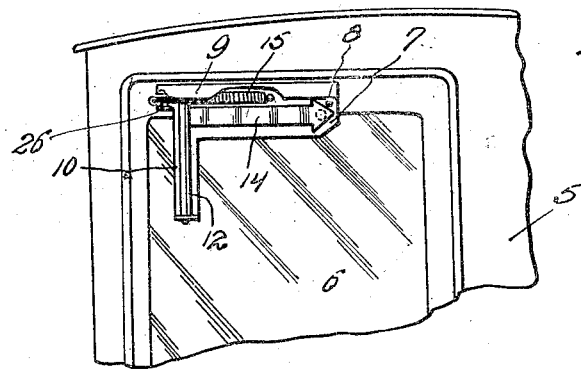
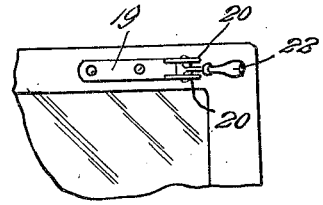
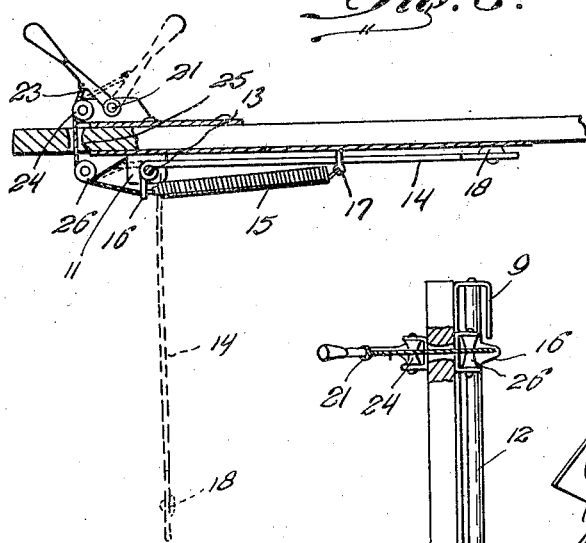
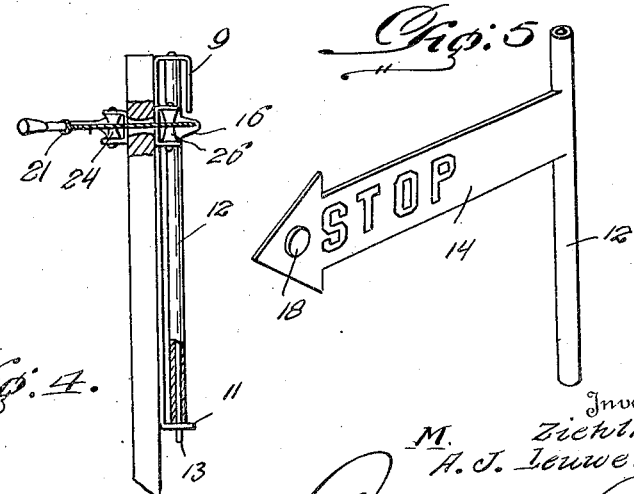
Inventors
M. Ziehlke,
A. J. Leuwer,
By Clarence A. O'Brien
Attorney Patented Aug. 12, 1924.

1,504,853

UNITED STATES PATENT OFFICE.

MAX ZIEHLKE AND ANTHONY J. LEUWER, OF LINTON, NORTH DAKOTA.

DIRECTION SIGNAL.

Application filed February 25, 1924. Serial No. 695,072.

*To all whom it may concern:*

Be it known that we, MAX ZIEHLKE and ANTHONY J. LEUWER, citizens of the United States, residing at Linton, in the county of Emmons and State of North Dakota, have invented certain new and useful Improvements in Direction Signals, of which the following is a specification.

This invention relates to certain new and useful improvements in direction signals for motor vehicles and has particular reference to the provision of a device of that kind particularly adapted for use upon closed cars.

The primary object of the invention is to provide a direction signal for use upon motor vehicles known as coupés and sedans, and by means of which the driver may readily indicate his intention to turn when the glass panel in the adjacent side of the vehicle body is closed and is thereby unable to extend his arm outwardly of the side of the vehicle.

Another object of the invention is to provide a signal of this kind and type which embraces the desired qualities of simplicity, durability and efficiency of operation, so that the device may meet with all of the requirements for a successful commercial use.

Briefly described, the present direction signal constitutes the provision of a member that is to be rigidly secured to the outer side of the front left hand coupé or sedan door, and to which is pivotally secured an indicating arm that is normally positioned through the medium of a spring, in close engagement with said attaching member, means being provided upon the inside of said coupé or sedan door whereby said indicating member may be swung to an operative indicating position.

An additional object of the invention is to provide an attaching member that also effects a hood for the arm retracting spring, as well as the operating table, so as to prevent the collection of dirt, moisture, or other foreign matter thereon which would result in the quick inefficiency of the spring, as well as a deterioration of said operating cord.

With the foregoing and other objects in view, as the nature of the invention will be better understood, the same comprises the novel form, combination and arrangement of parts hereinafter more fully described, shown in the accompanying drawing, and claimed.

In the drawing, wherein like reference characters indicate corresponding parts throughout the different views:

Figure 1 is a fragmentary, side elevational view, illustrating a direction signal constructed in accordance with the present invention operatively applied to a certain door of a closed car body with the indicating pointer in its normal inoperative position.

Figure 2 is a similar fragmentary side elevational view illustrating the pointer actuating means disposed upon the inner side of said coupé or sedan body closure door, Figure 3 is a detailed longitudinal sectional view of the device, the indicating pointer as well as its operating means being shown in full line in-operative position as well as dotted line operative position.

Figure 4 is an edge elevational view of said sedan or coupé door equipped with my improved direction signal which is also shown in edge elevation, and Figure 5 is an enlarged perspective of the indicating pointer per se.

Referring more in detail to the drawing 5 indicates the body of the so-called closed car or automobile, the doors of which are provided with vertically movable glass panels 6, which may be lowered for opening the same as is well known in the art, the door herein shown being that adjacent the driver's seat of the automobile.

In accordance with the present invention, a signal is provided including a strip of sheet metal 7 that is adapted to be secured in a direction extending longitudinally with the upper frame member of said door through the medium of screws or other fastening means 8. The upper longitudinal edge of said sheet of strip metal 7 is bent forwardly and then downwardly in order to provide a protecting hood for purposes presently to be set forth, said protecting hood being more clearly shown in the edge elevational view, Figure 4.

At the forward end of said sheet metal strip 7, the same is formed with a relatively elongated pendant strip 10, that is outturned at its lower end to provide a lug 11, Figures 1 and 4.

Disposed between said outturned portion or lug 11 of said pendant strip 10 and the top wall of the hood 9, is a hollow rod 12, that is disposed for rotation around a solid rod 13 that extends through said hollow rod 12, as well as the registering openings in the top wall of said hood 9 and said lug 11 of the pendant strip 10 of said sheet metal strip 7.

This hollow rod 12 is formed adjacent its upper end with a right angularly extending indicating arm or pointer 14 that is of general arrow shape as shown in Figure 5, and through the medium of a retractile spring 15 that is connected at its opposite end to a lug 16 formed on the upper end of said hollow rod 12 and to a pin 17 that is secured to the sheet metal strip 7, said pointer or indicating arm 14 is normally maintained in a full line position of Figure 3, that is, at a point directly adjacent said sheet metal strip 7. The end of this pointer or indicating arm 14 is provided with a rubber button 18 that engages said sheet metal strip 7 for preventing rattling between this strip and the pointer or indicating arm 14.

Upon the inner side of the closed car door, at a point adjacent the front end of said sheet metal strip 7, and, likewise secured to the upper frame bar of the door, is a sheet metal bracket or strap 19, the forward end of which is formed with a pair of spaced ears 20—20 between which is pivotally secured as at 21, a hand lever 22.

Atttached at one end to said hand lever 22 is an operating cable 23 that extends forwardly over a guide pulley 24 disposed between said ears 20—20 of the strap 19, which extends outwardly through an opening 25 formed in the door of a car as clearly shown in Figure 3. This operating cable 23 then passes over another pulley 26 that is suitably carried by the sheet metal strip 7, after which the same is rigidly anchored to the before mentioned lug 16 formed upon the upper end of said hollow rod 12 of the pointer or indicating member 14.

If desired, this indicating pointer 14 may be provided upon its inner side with the indicating word "Stop," "Turn" or the like, and in actual practice, it will of course, be at once apparent that when the driver of the vehicle intends to make a turn, or to bring his machine to a stop or slow down the same, the operating handle 22 is moved from the full line position of Figure 3, to the dotted line position as shown, that obviously pulls upon the lug 16 of the hollow rod 12, for moving the pointer or indicator arm 14 to the dotted line position of said figure, against the action of said retractile spring 15. Immediately upon releasing said handle 22, the force of the spring 15 will manifestly return the pointer or indicating arm 14 to its inoperative full line position of Figure 3.

It will thus be seen that we have provided a highly novel, simple, and efficient form of direction indicator, and one that may be effectively employed for indicating the intentions of the driver of the vehicle to make a turn, bring the machine to a stop, etc., without the necessity of said driver extending his arm through the door which is a great inconvenience during cold or inclement weather.

We do not wish to be limited to the specific structural elements shown in the drawing and set forth in the specification, and in the future practice of the invention, minor changes may be made therein without departing from the spirit and scope of the appended claims.

Having thus described our invention, what we claim as new and desire to secure by Letters Patent is:

1. A direction signal comprising a member adapted for attachment to the upper end and outer side of a closed car door, a pendant extension formed upon the forward end of said member, and being formed with a lateral lug at its lower end, a rod journalled between said lug and said first mentioned member, an indicating pointer carried by said rod, means for maintaining said pointer normally beside said member, means upon the inner side of said car door whereby said member may be forced outwardly to an indicating position, said means comprising a flexible member secured to the rod at one end and extending through an opening in said car door, and a handle pivoted to the inner side of said door to which the opposite end of said table is attached.

2. An automobile signal comprising an attaching member for external disposition, said member comprising a horizontally elongated strip having its upper edge bent upon itself to provide a channeled weather guard, said member also including a depending strip provided with a laterally disposed bearing ear, an indicator adapted for disposition beneath said guard and against said horizontally disposed strip, said indicator including a mounting shaft having one end journaled in said ear and its other end journaled in the bearing opening formed in said guard, a horizontal bracket adapted for internal disposition opposite said attaching member, a lever pivotally mounted on said bracket, pulleys on said bracket and attaching member, a flexible pull cord connected at one end to said lever and at its opposite end to said indicator, and spring means for normally holding the indicator in an inoperative position.

In testimony whereof we affix our signatures.

MAX ZIEHLKE.
ANTHONY J. LEUWER.